United States Patent [19]
Skala

[11] 3,888,303
[45] June 10, 1975

[54] THERMAL EXCHANGE FLUID PREPARATION OF FOODS

[76] Inventor: Stephen F. Skala, 3839 S. Wenonah, Berwyn, Ill. 60402

[22] Filed: Oct. 20, 1972

[21] Appl. No.: 299,214

[52] U.S. Cl. .................................. 165/2; 165/26
[51] Int. Cl. ........................................ F25b 13/00
[58] Field of Search ............... 165/1, 2, 12, 26, 27

[56] References Cited
UNITED STATES PATENTS
2,508,212  5/1950  Ball ........................................ 165/12

Primary Examiner—Charles Sukalo

[57] ABSTRACT

A system used principally in domestic preparation of food consists of a plurality of houseware units and a central appliance between which a thermal exchange fluid can circulate. The central appliance includes heating and refrigeration devices, hot and cold thermal reservoirs, circulating pumps, and thermostatically controlled flow regulating valves. Houseware units are coupled to the central appliance through self sealing quick connecting valves. Thermal exchange fluid transfers heat between a thermal reservoir and the cooking surface of a houseware unit.

7 Claims, 4 Drawing Figures

THERMAL EXCHANGE FLUID PREPARATION OF FOODS

This invention relates to a system for transferring heat to and from substances to quickly reach predetermined hot and cold conditions of the substances. The invention particularly relates to a system of domestic appliances and houseware units used jointly to quickly and reliably heat and cool food substances in accordance with predetermined settings.

Conventional methods of cooking based upon flame or electric resistance heating typically operate at a high temperature and have limited heat capacity. These methods are satisfactory where heat transfer is limited by thermal impedence of the food material, or where surface charring is desirable. Known induction heating avoids scorched appliance surfaces, but otherwise heat transfer from a cooking surface is conventional. Known microwave cooking is independent of the thermal conductivity of the food since it is heated by radiation absorbed through electrical interaction with polar molecules. Microwave cooking, as well as the previous cooking techniques, operate commonly by transferring heat into the food substances. Each method has its advantages, as well as shortcomings, which are generally recognized in the art. Each cooking method enriches the art, by providing alternative ways for cooking food substances.

It is readily acknowledged in the art that any assembly, system or method would be highly desirable which can control cooking temperature, as well as providing chilling or freezing capabilities. Quickly attaining such levels is another readily acknowledged advantage in this art. Controlled temperature heat transfer to the hot and cold sides is commonly practiced in various cooking techniques. As an example, iced coffee must be prepared through the steps of rapidly boiling water, maintaining the boiling condition while coffee is being brewed, and then rapidly chilling to obtain the iced coffee. Another example is Pasteurization where a food is maintained at temperatures sufficient to inactivate inimical organisms, but not at a temperature level which would undesirably alter nutritional or taste components. Yet another example is pressure deep fat frying wherein the food is rapidly brought to a high temperature and pressure, which levels are regulated throughout the cooking period. When cooking is completed, the temperature is quickly reduced below boiling, and the prepared food is removed. Even conventional cooking functions such as roasting at set temperature levels involve heat transfer at controlled temperature. Various houseware units or apparatuses are used in such conventional cooking, such as broilers, coffee makers, deep fat fryers, ovens, roasters, hot plates, waffle irons, sandwich grills, griddles, skillets, corn poppers, pressure cookers, casseroles, saucepans, hot trays, and chill or freeze appliances, such as ice-cream, milkshake and slush-makers.

Other types of appliances which involve controlled heat transfer may be considered as convenient location appliances, including sink-attached hot or ice water beverage units, sinkattached instant ice makers, and small built-in refrigeration units. Other appliances embodying controlled heat transfer include personal care and health aids, such as lotion warmers, heating pads, cold packs, and facial saunas. Likewise, tablewares, such as heated and cooled plates and cups. In addition, various appliances fall in such category, including clothes ironers and dryers and dehumidifiers.

The prior art has recognized that such controlled heat transfer can take place by utilizing a thermal exchange or heat storage fluid which can flow to a cooking appliance or be contained therein. Such appliances or food processing devices usually have double walls between which the thermal exchange fluid is introduced, such as a cup which can be stored in the freezer. In such a cup, the fluid sealed between the walls has sufficient capacity to freeze milkshake mixtures. Other examples include double boilers, steam tables and double walled table servers.

It is accordingly one important object of the present invention to provide an improved system for quickly transferring controlled heat levels through the use of a cycled exchange fluid to which is imparted preset heat levels, and which includes quickly delivering such a thermal fluid to quickly heat or cool a substance in contact with a houseware unit.

Another important object of the invention is to provide such an improved system which utilizes a domestic appliance having a central source of temperature controlled thermal energy used in conjunction with a plurality of houseware units, through which said thermal energy is transferred to contained fluid or other substances.

Still yet another important object of the present invention is an improved system wherein a thermal exchange fluid is stored at desired heat content in a control appliance, a traveling thermal exchange fluid is heated by such stored fluid and then is quickly delivered through improved coupling means to houseware appliances so as to reduce fluid loss and alteration in heat levels.

Yet still another important object of the present invention is an improved system which utilizes an appliance for raising or lowering the temperature of a stored thermal exchange fluid to, in turn, control the temperature of a thermal fluid which is quickly delivered to chambers of houseware units by coupling means which open the path for the thermal fluid and which close the path when the appliance is disengaged, so that food materials placed within the appliances can be quickly heated or chilled.

The objects and advantages recited are attained, together with still other objects and advantages which will become apparent to the practitioner, by the invention of the following disclosure, which includes drawings wherein.

The system of the present invention provides a method for cooking or transferring heat in an improved manner by utilizing improved apparatus to obtain rapid heat transfer into thermal fluid, and delivery of the thermal fluid to rapidly attain controlled cooking temperatures, or chilling and freezing capabilities. Controlled circulation of heat exchange fluid is maintained through components which include stored and travelling thermal fluids, thermal energy sources, temperature control devices, valves, pumps, and various houseware units. The travelling thermal exchange fluid is preferably a silicone oil which is fluid at sub-freezing temperatures and resists chemical breakdown at high cooking temperatures. A source of thermal energy is preferably a thermostatically controlled resistance heating element which provides energy for a hot reservoir containing the thermal exchange fluid. A refrigeration unit provides energy for heat removal for a cold reservoir of the thermal exchange fluid.

The thermal exchange fluid at preset temperature levels, low or high, is delivered through a path to a valving assembly between the path and a double walled domestic appliance. The domestic appliance or houseware unit is coupled to the central appliance containing a hot and cold reservoir by the valving assembly which preferably includes self-sealing, quick connecting valve elements. Such valve elements allow two-way quick connect sealing to maintain the fluids in the path or line and in the houseware unit when uncoupled. When the houseware unit and central appliance are coupled, the thermal or heat exchange fluid flows freely therebetween. To effectively reduce fluid loss at uncoupling, a sliding action valve is presented as a preferred embodiment.

A central appliance has insulated hot and cold reservoirs, respectively provided with heating and refrigerating units. The thermal exchange fluid is stored in these reservoirs and imparts desired temperature levels to thermal fluids which are delivered along closed paths directly to the houseware units or to precisely adjustable temperature control means prior to delivery to a houseware unit. The fluid enters double walled compartments or thermal chambers of houseware units through coupling and valving assemblies. The thermal fluid is moved in the system under urging of pumps. The thermal fluid moves through pipes and couplings, past heat exchangers, temperature regulators, coupling and valving assemblies between houseware units and lines of a central appliance assembly.

Figure 1:
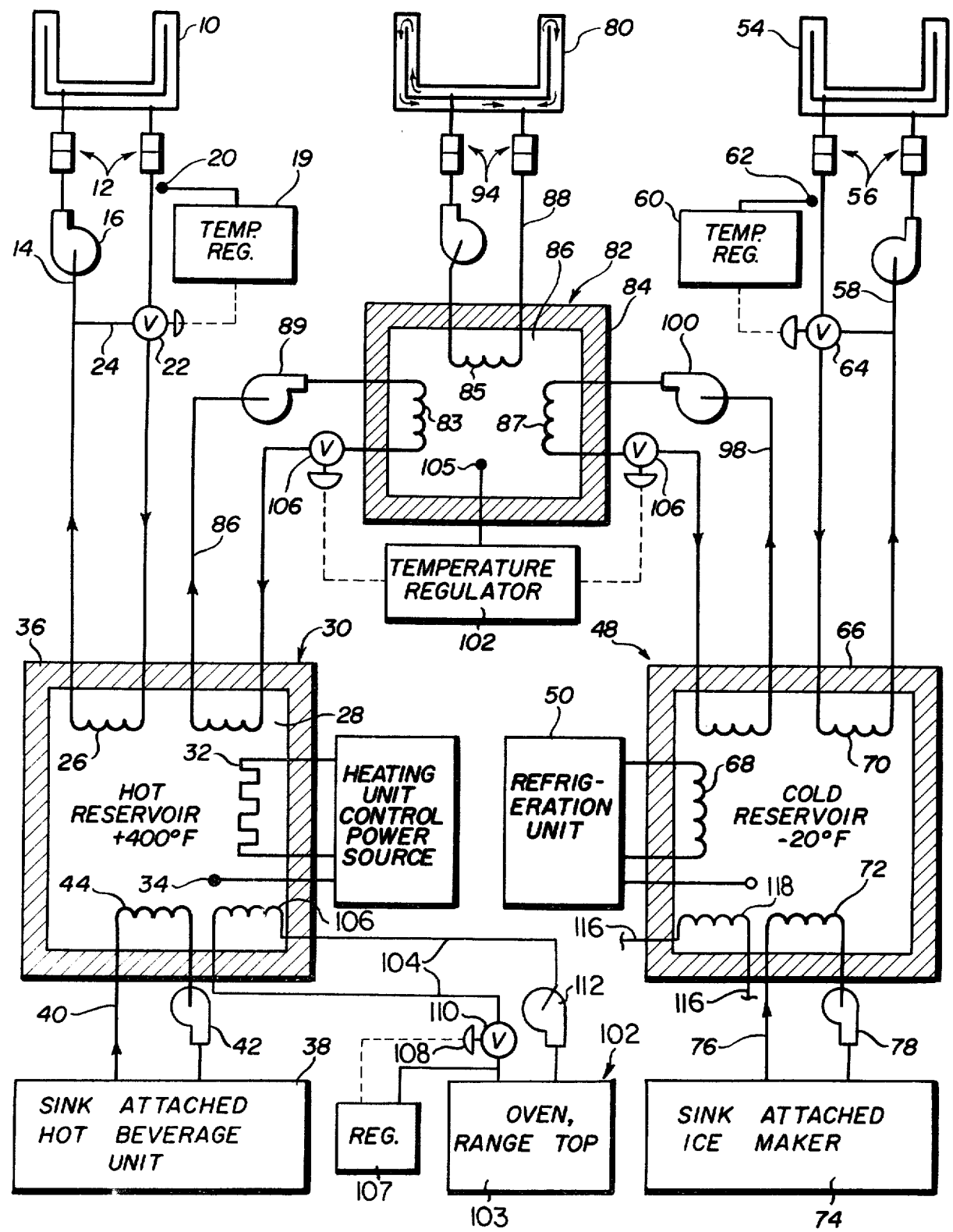
FIG. 1 is a schematic illustration of the improved cooking system showing houseware units and a central appliance.

Looking now at the drawings, FIG. 1 diagrammatically illustrates the assembly as including a houseware unit 10 intended to represent an oven, grill or fryer. A coupling and valving assembly shown generally as 12 connects the houseware unit 10 to a thermal fluid line 14. A pump 16 drives travelling thermal fluid, such as silicone oil along the line 14. A temperature regulator 19 measures the temperature of the thermal fluid leaving the houseware unit 10 by means of a sensor 20, such as a thermistor which controls the valve 22 to direct the thermal fluid through shunt 24 or heat exchanger 26 immersed in thermal fluid 28, stored in hot reservoir 30.

The thermal storage fluid 28 is maintained at a high temperature in the hot reservoir by a resistance heating element 32 provided with a temperature sensor 34. The hot reservoir defines a closed chamber and the walls thereof are preferably provided with continuous insulation 36. An accessory, such as a sink-attached hot beverage unit indicated at 38, may be attached to the hot reservoir. A heat exchange line 40 and pump 42 are connected to heat exchanger 44. The hot beverage unit 38 may store water for instant coffee, tea, soup, or the like.

The central appliance is also provided with a cold reservoir shown generally as 48. A refrigeration unit 50 maintains the body of thermal fluid 52 at desirably low caloric values, say, to −20°F. The thermal storage fluid 52 may be ethylene glycol, brine, or other such liquid materials having a low freezing point. The cold side of the system is similar to the hot side in that a double walled houseware unit 54 is used as a chilling unit. Coupling and valving assemblies 56 are used for connecting the flow of cold thermal fluid from line 58 to the houseware unit 54. Temperature regulator 60 with sensor 62 and valve 64 is provided in a manner similar to that previously shown in association with the hot side.

The cold reservoir is similarly provided with a continuous wall of insulation 66 and various heat exchangers are immersed in the body 52 of stored thermal fluid, including exchanger 68 of the refrigeration unit 50, exchanger 70 for the conduit or pipeline 58, and exchanger 72 for accessory sink attached cold unit 74, which may be a water cooler, an ice-maker, a refrigerator unit, or the like. Line 76 and pump 78 are provided, and are similar to those previously described.

Houseware unit 80 is shown set up for precise temperature control, or for cycling hot and cold thermal fluids. Use is made of an adjustable temperature storage reservoir 82 which has a continuous insulation wall 84, as previously shown for the hot and cold reservoirs. A body of thermal storage fluid 86 is within the adjustable temperature reservoir chamber, and such body of fluid transfers thermal energy between the respective heat exchangers 83, 85 and 87. Heat exchanger 83 communicates with hot reservoir 30 through line 86 and pump 89. Heat exchanger 84 controls the heat content of the thermal fluid in line 88, and such fluid is delivered under urging of pump 90 through coupling and valving assemblies 94. Heat exchanger 85 communicates with the cold reservoir 48, and thermal fluid passes through closed line 98 under urging of pump 100.

A temperature regulator 102 maintains a preselected or programmed temperature level in the body of stored thermal fluid 86 by opening or closing valve and sensor assemblies 106. In accordance with preselected levels, thermal fluids are delivered from the hot or cold sides to the respective heat exchangers to raise or lower the temperature of the body of fluid 86 in the adjustable temperature reservoir 82.

A hot plate or stove cooking top shown generally as 102 may be provided for receiving travelling thermal fluid directly without coupling and valving means. Such a unit can be provided with a smooth heat conducting surface 103 having portions on the underside in communication with the travelling thermal fluid (not shown). Foods may be cooked directly on a planar or concave smooth surface 103. A houseware unit may also be placed thereon which has a thick cell of plastic stable at high temperatures such plastic cell being fixed in a frame to assume the configuration of a pot or pan (configuration not shown in the drawings). The assembly of the plastic configuration and frame is positioned on the surface 103 so that substantial areas of the plastic film contacts the surface to provide sufficient thermal contact.

A conduit or line 104 has a heat exchange portion 106 immersed in the body of storage fluid in the reservoir 30 and such lines may be fixed to the unit 103 in conventional ways so that the travelling thermal fluid enters the unit and circulates in the portion which heats the flat surface 103. A path within the unit 103 is not shown, but it communicates with lines 104 to define the closed path of the travelling fluid between the unit 103 and the reservoir 30. A temperature regulator 107 is provided to preset the temperature in unit 102, and the temperature of the travelling thermal fluid is sensed by sensor 108 to control the opening and closing of three way valve 110 to control movement of the travelling fluid in the closed path. A pump 112 urges movement of the travelling fluid in the closed path.

A similar assembly may be provided on the cold side so that a chill unit (not shown) is connected by conduit or line 116 to the cold reservoir 48 through heat exchanger means 118. The line is also mounted directly to the chill unit by conventional fastening means, and such an assembly may be similarly provided with a temperature regulator, sensor and valving assembly, and a pump as shown in connection with heating unit 103. The chill unit may be in the form of an icebox so that the temperature regulator can preset the temperature from subfreezing levels, for quickly making ice-cream or ice, to succeedingly warmer temperatures required for various purposes.

Figure 2:
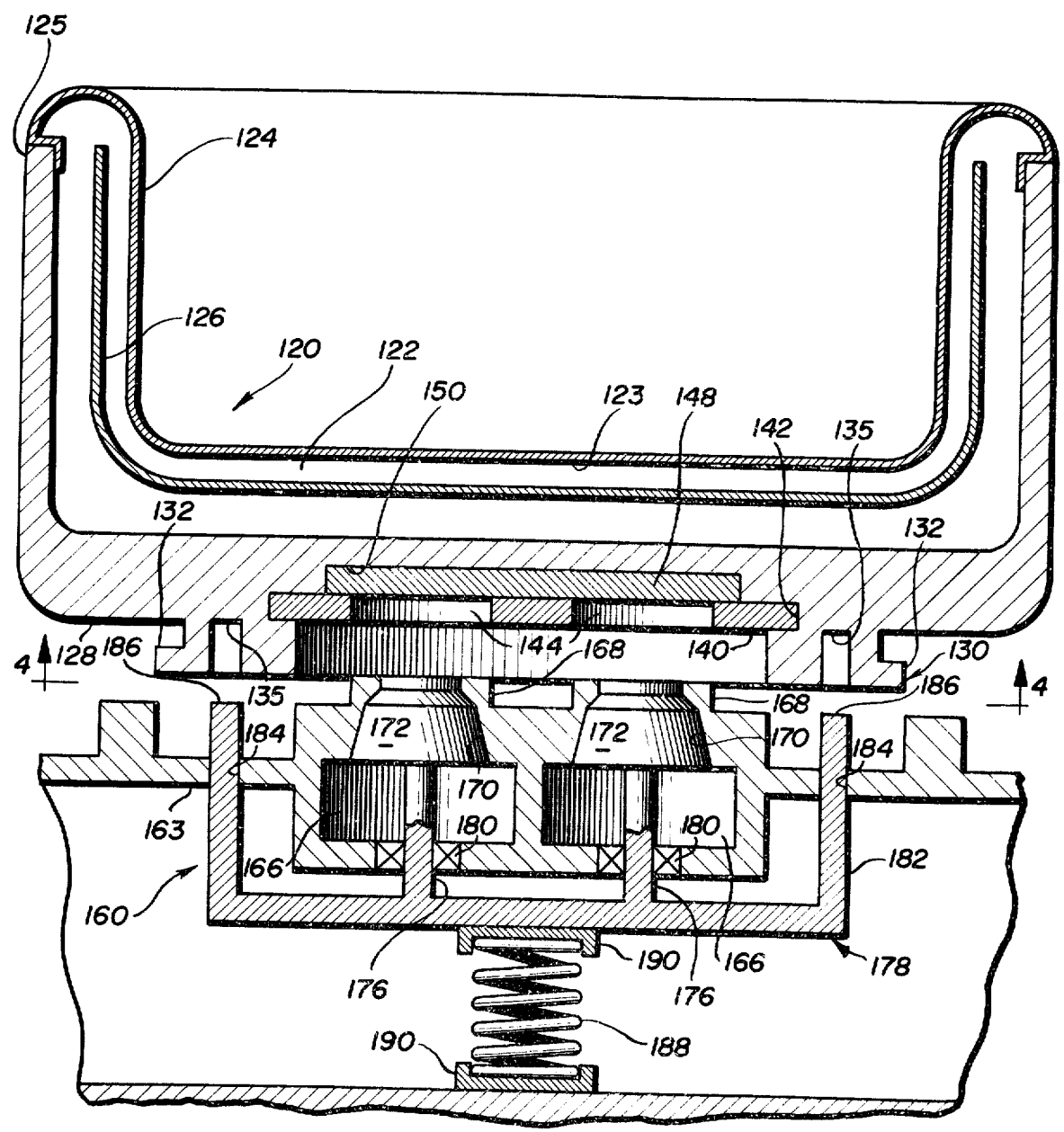
FIG. 2 is a diagrammatic side sectional view with parts removed, of a coupling and valving assembly and a houseware unit, said view taken along line 2—2 of FIG. 4.
Figure 3:
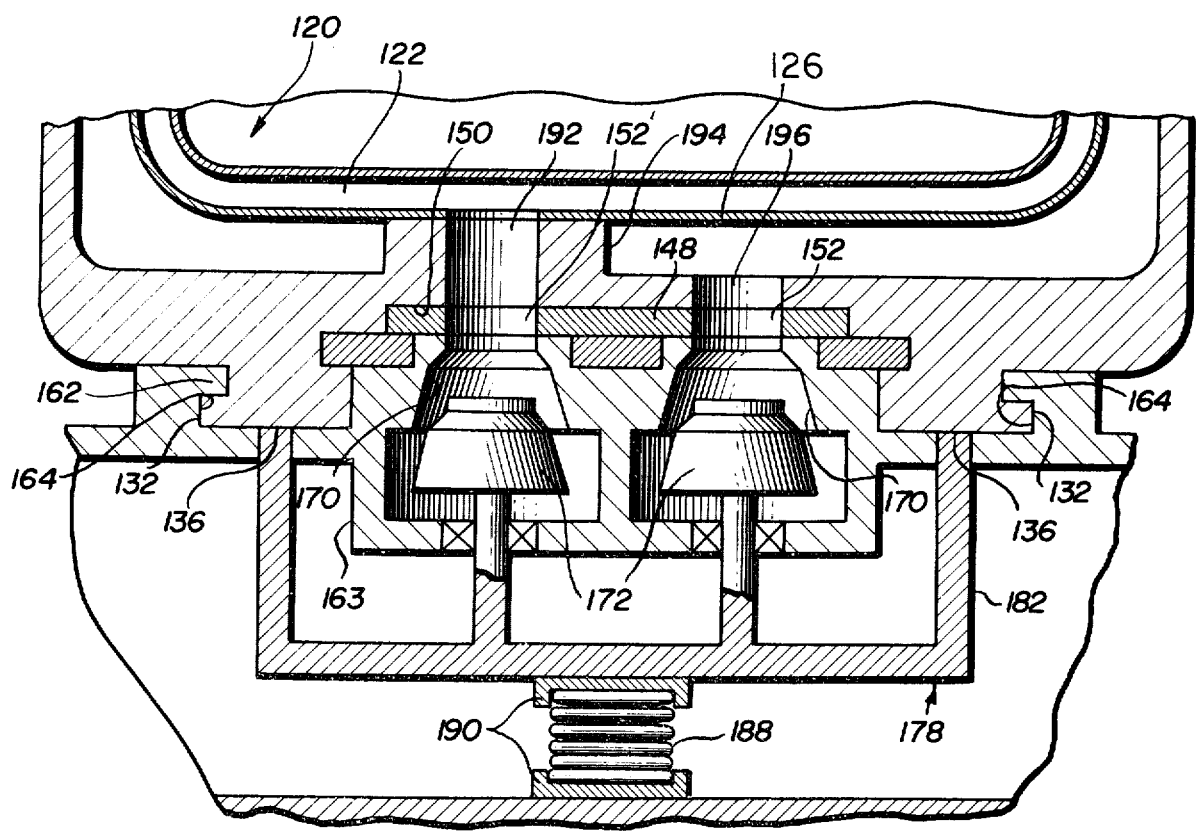
FIG. 3 is a view similar to that of FIG. 2, but showing the houseware unit rotated about 90° to couple and open the coupling and valving assembly.

FIGS. 2 and 3 illustrate valving and coupling means used to connect the travelling thermal fluid to a houseware unit indicated generally at 120. The travelling thermal fluid 122 moves through chamber 123 which is formed between double walls including inner wall 124 and thicker outer wall 125. A baffle element 126 is provided in the chamber 123 to direct the path of the travelling thermal fluid 122.

The bottom 128 of the houseware unit is shown as being thick relative to outer wall 125, and such bottom 128 is further modified with an annular depending coupling member shown generally as 130. Such coupling member is shown as having opposed arcuate flanges or male interlocking elements 132, and a pair of opposed cams 134 having cam surfaces extending from low points 135 to high points 136.

The bottom 128 of the houseware unit is further provided with a valve plate 140 having circumferential edge portions seated in annular groove 142 so that the houseware unit may be slidably rotated relative to valve plate 140. The valve plate is provided with openings 144. Plate 140 closely contacts a moving surface of an elastomeric disc member 148 which is fixed in well 150 in the bottom of the houseware unit. The elastomeric disc, which can be formed of urethane, rotates with the houseware unit so that openings 152 in the elastomeric disc may be registered with the oversized openings 144 in the valve plate 140.

The bottom of the houseware unit is engaged with the coupling portion of the assembly includes arcuate flange elements 162 which, together with adjoining housing portions 163, define female locking slots 164. The body member 163 has receptacle chambers 166 for travelling fluid which leaves and enters such receptacles from the closed lines or conduits by means which are not shown. The top of body member 163 is provided with bosses 168 which are formed around pop-in valve seats 170. The bosses 168 are dimensioned to closely fit over-sized openings 144 in valve plate 140. Poppet valves 172 operate the valving portion of the assembly by opening and closing the passageways defined by the valve seats.

The poppet valves 172 are fixed to valve shafts 176 which are mounted to moveable body member 178. The shafts move past fluid-tight seals 180 provided in the bottom of body member 163. The moveable body member 178 has upright arcuate wall portions 182 which move through arcuate bores 184 in body portions 163. The top edges 186 of the walls 182 may be viewed as cam followers adapted to ride the surfaces of the cam elements 134 in annular member 130 at the bottom of the houseware unit. Body part 178 moves against the urgings of spring 188 positioned between fixed retainers 190.

In operation, the bottom of a houseware unit is contacted with the valving and coupling assembly so that low cam surface 135 contacts cam follower 186 of the moveable body part 178. The relative position of said valving and coupling means and the houseware unit, immediately prior to engaging the cam follower with the low cam surface 136, is shown in the view of FIG. 2. Bosses 168 at the top of body member 163 enter over-size openings 144 in the valve plate at the same time that cam followers 186 contact low cam surfaces 135. The bosses fix the valve plate 140 against movement while the houseware unit is rotated about 90° so that male locking elements 132 interlock with female slots 164, this position being shown in the view of FIG. 3.

The bottom 128 of the houseware unit has a passageway 192 which is formed by continuous wall 194 extending to baffle element 126. Passageway 192 and one of the ports 152 in the elastomeric disc 148 form a common passage. The bottom of the houseware unit also has openings 196 which forms a common passage with the other port 152 in the elastomeric disc. Such common passages in the bottom of the houseware unit and the elastomeric disc are placed in registery with the over-size openings 144 in valve plate 140 following rotation of the houseware unit about 90°, such position being shown in the view of FIG. 3. It will be seen that the common passages defined, in part, by opening 192 direct the travelling fluid to one side of the baffle element 126 for introducing travelling thermal fluid into the chamber, while the other common passage defined, in part, by opening 196 directs the travelling fluid to the other side of the baffle element 126 to return the travelling fluid to receptacle 166 of the valving portion of the assembly.

Figure 4:
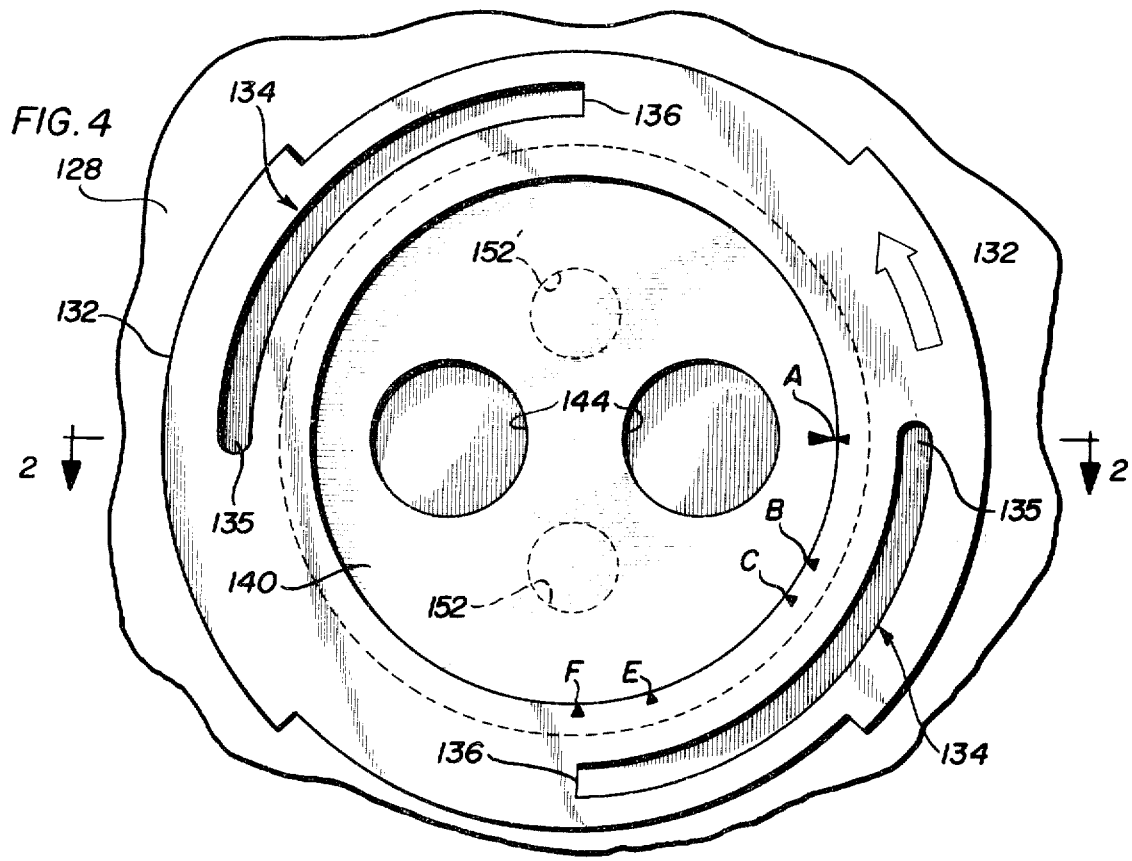
FIG. 4 is a diagrammatic bottom plan view of the houseware unit taken along line 4—4 of FIG. 2.

Looking at the bottom plan view of FIG. 4, the high cam surfaces 136 of the cam elements 134 are flush with the bottom of annular member 130; and the low cam surfaces 135 are recessed in the annular member. The houseware unit may be viewed as being rotated counter-clockwise during the coupling and valving engagements. Point A may be considered as moving in a counter-clockwise direction during coupling and valving engagements, the illustrated position of Point A representing the valving portion of the assembly as being fully closed. During counter-clockwise rotation, Point B moves to the position formaly occupied by Point A. At this position, the edge of opening 152 in the elastomeric disc begins to be exposed at over-size port 144 of the plate valve 140. When Point C arrives at the original position of Point A, the lower area portions of cams 134 contact followers 186 which start to open the poppet valves against the urging of the spring 188.

When Point E reaches the original position of Point A, opening 152 is fully registered with over-size opening 144 and the poppet valves have opened sufficiently to allow introduction of the travelling thermal fluid. When Point F reaches Point A's original position, the houseware unit is totally coupled and all the poppet valves are fully opened as indicated in the view of FIG. 3.

The claims of the invention are now presented, and the terms of such claims may be further understood by reference to the views of the preceding drawings, and the language of the preceding specification.

What is claimed is:

1. A method for rapidly attaining predetermined temperature levels of a food or beverage substance in a houseware unit by delivering thermal fluid to a chamber of said houseware unit which is connectable to a coupling and valving zone, including the steps of
   storing a body of thermal fluid in a thermal reservoir,
   attaining desired heat content of the stored body of thermal fluid in said thermal reservoir,
   maintaining a desired heat content of the body of thermal fluid stored in said reservoir,
   connecting said houseware unit to the coupling and valving zone,
   opening said zone to the travelling thermal fluid,
   delivering the travelling thermal fluid under pressure along a closed line through the connected open zone to the chamber houseware unit, and
   returning said travelling fluid from the houseware unit through the opened connected zone to the thermal reservoir so that a succeeding charge of travelling fluid of desired heat content may be delivered to the houseware unit to attain predetermined temperature levels in said houseware unit.

2. A method which includes the steps of claim 1 above, which further includes the steps of selectively delivering said travelling fluid to said houseware unit following communication with a hot thermal reservoir and a cold thermal reservoir to attain low or high heat content in said travelling fluid, and controlling the heat content of said hot and cold thermal reservoirs by respectively heating and chilling said reservoirs to attain predetermined heat contents in said reservoirs.

3. A method which includes the steps of claim 2 above, and which further includes the steps of delivering said thermal fluid to a temperature regulator zone preset to desired temperature levels, and maintaining said temperature regulator zone at the preset temperature levels by sensing the temperatures therein and responsively controlling entry of the travelling fluid from the thermal reservoirs, and delivering the controlled temperature thermal fluid from said temperature regulator zone to said houseware unit.

4. A method which includes the steps of claim 2 above, and which further includes the steps of connecting an accessory hot liquid zone to said hot thermal reservoir and an accessory cold thermal liquid zone to said cold reservoir so that respective hot and cold thermal fluids maintain heated and cooled liquid for domestic utilization.

5. A method which includes the steps of claim 1 above, and which further includes contacting a closed line with said thermal reservoir to exchange heat therebetween, including movement of said travelling thermal fluid through said closed line to a said valving and collection zone coupled to said houseware unit, thereby introducing the travelling thermal fluid into the houseware chamber, and returning said travelling thermal fluid through said coupling and valving zone, and cycling said travelling thermal fluid in the closed line through the thermal reservoir and through the houseware unit.

6. A method which includes the steps of claim 2 above, wherein said substance is deposited in the houseware unit, wherein the houseware unit is then manually coupled to both secure the houseware unit to said coupling and valving zone, and to concurrently open said zone to communicate travelling thermal fluid with the chamber of the houseware unit, said travelling thermal fluid being urged along a closed path, a part whereof is immersed in a thermal reservoir containing stored thermal fluid to attain desired heat levels in the travelling thermal fluid of the closed path, and moving the travelling fluid in said path so that the desired heat level of the houseware unit is maintained by movement of the travelling fluid through said stored fluid in the thermal reservoir.

7. A method which includes the steps of claim 6 above, wherein said closed line includes a temperature regulator assembly having a temperature sensor and valving means to open and close the path of the travelling thermal fluid in response to changes from preset temperature levels of the temperature regulator.

* * * * *